United States Patent [19]

Christian

[11] 4,074,754
[45] Feb. 21, 1978

[54] METHOD FOR PRODUCING GEOTHERMAL ENERGY AND MINERALS

[75] Inventor: Lawrence D. Christian, Houston, Tex.

[73] Assignee: Exxon Production Research Company, Houston, Tex.

[21] Appl. No.: 727,210

[22] Filed: Sept. 27, 1976

[51] Int. Cl.² .................. E21B 43/00; E21B 43/24
[52] U.S. Cl. ................... 166/245; 166/250; 166/263; 166/305 R; 299/5
[58] Field of Search ............ 166/245, 250, 263, 272, 166/275, 302, 305 R; 299/5; 165/45; 60/641

[56] References Cited

U.S. PATENT DOCUMENTS

| | | | |
|---|---|---|---|
| 2,637,531 | 5/1953 | Davidson | 166/263 X |
| 2,907,390 | 10/1959 | Moll et al. | 166/245 |
| 3,113,616 | 12/1963 | Dew et al. | 166/263 X |
| 3,373,804 | 3/1968 | Glass et al. | 166/263 |
| 3,537,526 | 11/1970 | Offeringa | 166/272 X |
| 3,584,686 | 6/1971 | Fulford | 166/275 |
| 3,679,264 | 7/1972 | Van Huisen | 166/272 X |
| 3,757,516 | 9/1973 | McCabe | 166/45 X |
| 3,864,917 | 2/1975 | Jacoby | 166/302 X |
| 3,957,108 | 5/1976 | Van Huisen | 166/302 X |
| 3,975,912 | 8/1976 | Greene | 60/641 |

*Primary Examiner*—Stephen J. Novosad
*Assistant Examiner*—George A. Suchfield
*Attorney, Agent, or Firm*—John S. Schneider

[57] ABSTRACT

A method for producing geothermal energy and minerals from subterranean high temperature and high salinity water reservoirs by injecting low salinity water at ambient surface temperature into the reservoir through a well bore, allowing the injected water to become heated in the reservoir and then producing water through the well bore to the surface for use as a source of energy and, optionally, minerals. Simultaneously with the employment of certain wells for injection-production cycles, other wells may be employed predominantly for injection of water to displace heat and in-situ well brines to well bores which produce such water and brines to the surface for utilization of their heat energy and dissolved minerals.

12 Claims, 1 Drawing Figure

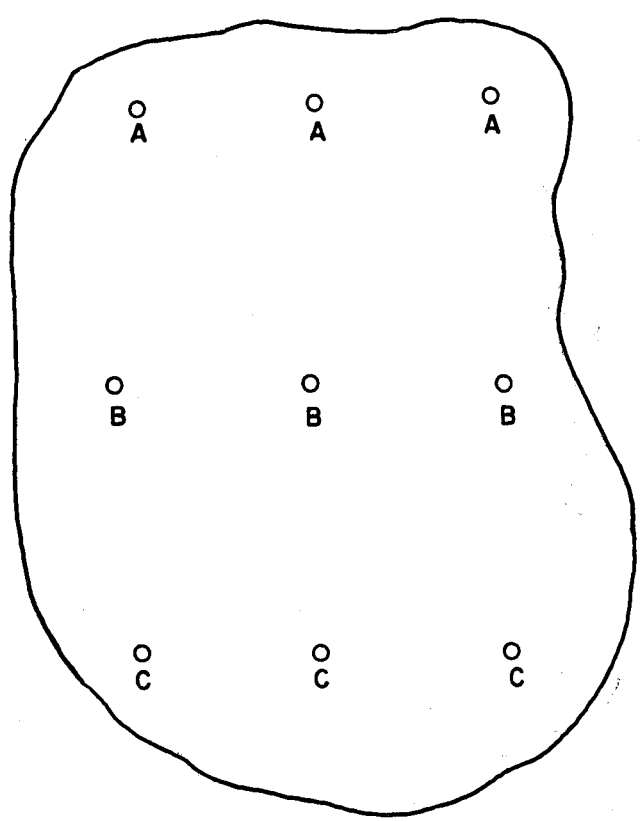

METHOD FOR PRODUCING GEOTHERMAL ENERGY AND MINERALS

BACKGROUND OF THE INVENTION

Field of the Invention

The present invention relates to the production of geothermal energy and/or minerals from subterranean high temperature, high salinity water reservoirs.

High temperature, high salinity subterranean brine reservoirs, such as are located in the Imperial Valley of California, provide an important source of geothermal energy and/or minerals. Wells drilled in this area show that reservoirs at 6000 feet depth contain brines with up to 250,000 ppm salts content and 600° F. temperature. The various soluble salts contained in these brines include sodium and potassium chloride, calcium, iron and magnesium salts. Also, other materials such as silica and ferrous compounds are often present in in the brines. Attempts to produce brine from these reservoirs for recovery of geothermal energy and minerals have been defeated by salt drop-out in the well bore, which occurs with reduction of pressure and temperature as the brines rise to the surface, rapidly plugging wells and surface equipment.

The present invention overcomes the problem of salt drop-out and permits recovery of energy and minerals from the geothermal brines.

SUMMARY OF THE INVENTION

The present invention is directed to a method for producing geothermal energy and/or minerals from subterranean high temperature and high salinity brine reservoirs in which fresh or low salinity water at ambient surface temperature is injected into the brine reservoir through a well; reservoir brine from the vicinity of the well bore is displaced; the injected water is heated by the reservoir heat and is then produced from the reservoir through the well. The volume of water to be injected in each injection-production cycle is selected on the basis of reservoir characteristics and overall project design. The well may be shut-in for a "soak" period following injection to permit time for the last water injected to be heated.

DESCRIPTION OF THE DRAWING

The sole drawing is a diagramatic illustration of the areal boundaries of a reservoir in accordance with one application of the invention.

DETAILED DESCRIPTION OF THE INVENTION

In accordance with the present invention there is provided a method for recovering geothermal energy from subterranean high temperature and high salinity reservoirs, and, optionally, recovering minerals, by injecting fresh or low salinity water into the reservoir through a well bore drilled into the reservoir. The injected water is at ambient surface temperature. The injected water displaces reservoir brine from the vicinity of the well bore. In the reservoir the injected water is heated by contacting the hot reservoir rock, by heat conduction from overlying and underlying formations, and by mixing with the reservoir brine. After injection of a volume of water selected on the basis of reservoir thickness, porosity, and permeability and other factors in the design of the operation, water from the well is produced. The reservoir may normally be shut-in for a period of time, a "soak" period, to allow time for the last water injected to be heated. The shut-in period is preferred but not necessary.

When placed on production the well produces previously injected water which has been heated in the reservoir. Depending on operating pressures and temperatures a fraction of the water produced may be in the vapor phase (steam).

After a period of production and before producing all of the injected water the well will commence producing reservoir brine mixed with the injected water. The brine fraction is low initially and increases with time until it reaches a selected level at which time the production phase is terminated. The fraction of injection water produced before brine production commences and the rapidity of brine fraction buildup is dependent on reservoir mixing characteristics which are, in turn, dependent on several factors including (a) reservoir thickness, (b) reservoir stratification, (c) fluid densities, (d) fluid viscosities and (e) injection and production rates. The produced brine fraction at which the injection-production cycle is terminated will usually be the fraction which yields a total well bore effluent salts concentration just below that at which salt precipitation or drop-out would become an appreciable operating problem.

Since not all of the injected water will be produced from the reservoir some water injected during previous cycles will remain around the well bore at the start of subsequent injection-production cycles. Thus, more water can be produced from the reservoir per barrel of injected water before reaching the limiting well effluent salt concentration as the number of cycles increases. In this manner a mechanism is provided for moving heat and in situ minerals into the well from reservoir distances beyond those penetrated by injection water during the initial injection phase. The uppermost limit of the salt content of the injected water is that at which no substantial amount of salt precipitates and drops out of the water later produced from the reservoir. Thus, the injected water has a salinity ranging from zero to a selected amount such that when the water is produced from the reservoir, substantially no precipitation of salt occurs in the well bore.

Injection of cold water reduces the temperature of the reservoir around the injection wells. That reservoir volume can be reheated by overinjecting in selected wells to displace reservoir heat back to the vicinity of cold wells.

An operating method for reheating "cold" wells may be accomplished as follows.

Referring to the drawing there is shown the areal boundaries of a high temperature, high salinity reservoir and nine wells drilled into the reservoir. Wells "B" are drilled initially and operated on an injection-production cyclic basis as described above. When temperatures of the produced water approach an unsatisfactory low level row "A" wells are drilled and operated on the injection-production cyclic basis with row "B" wells shut-in. When temperatures of the produced water from row "A" wells approach an unsatisfactory level row "C" wells are drilled and used for the cyclic injection-production operation. Injection is continued into the row "A" wells to displace heat to the vicinity of the "B" wells. Production is then continued from wells in rows "B" and "C" with sufficient water injection into those wells to allow production at permissible salt concentrations. By this technique a large fraction of the reservoir heat and initial in situ water is recovered. Such a "line drive" displacement plan is but one of a number of injection-production well configurations and sequencing which might be used.

It may be desirable in some reservoirs to selectively perforate only part of the reservoir thickness in order to achieve optimum reservoir mixing of the injected and in situ waters.

Fresh or low salinity water from a source external to the geothermal reservoir is required to initiate exploitation in accordance with this invention. By low salinity water is meant a salt concentration less than the salt concentration of the reservoir brine and below that concentration which would result in substantial salt precipitation from the produced water and thereby an appreciable operating problem. After production is underway the produced low salinity water and steam condensate can be injected into wells operating on a cyclic basis and water with high salinity can be injected for reservoir drive displacement. Thus, the volume of fresh or low salinity water from external sources and the volume of produced water to be disposed of is minimized.

Advantages of the present invention as compared with methods proposed and tried previously for producing the high temperature, high salinity reservoirs include the following:

1. The severe salt drop-out problem is eliminated making exploitation of high temperature, high salinity reservoirs possible.

2. A higher fraction of the reservoir's geothermal energy is recoverable using the displacement drive of the present invention than could be recovered using the proposed natural reservoir fluid-rock expansion drive.

3. By maintaining flowing production through injection into the reservoir the need for artificially lifting brine from wells is eliminated.

Various changes and modifications in the illustrative embodiments of the invention shown and described herein can be made without departing from the scope of the invention as defined in the appended claims.

What is claimed is:

1. A method for producing geothermal energy and/or minerals from subterranean high temperature, high salinity brine reservoirs comprising the steps of:
    injecting fresh or low salinity water into said reservoir and into contact with said reservoir brine;
    halting said injection of said fresh or low salinity water; and
    producing said injected water from said reservoir, said reservoir heat heating said injected water in said reservoir.

2. A method as recited in claim 1 in which said water is injected through a well drilled into said reservoir and said water is produced through said well.

3. A method as recited in claim 2 including repeating said injection-production cycle.

4. A method as recited in claim 3 in which the volume of water injected in each cycle is preselected.

5. A method as recited in claim 4 in which said volume of water is retained in said reservoir for a preselected period of time before producing said water from said reservoir.

6. A method as recited in claim 5 in which said reservoir brine is produced along with said injected water in said production step.

7. A method as recited in claim 6 in which first, second and third spaced apart rows of wells are drilled into said reservoir; and
    conducting injection-production cycles in each well of said first row of wells;
    shutting in each of said first row of wells;
    conducting injection-production cycles in each well of said second row of wells;
    conducting injection-production cycles in each well of said third row of wells; and then
    conducting injection in each well of said second row of wells while producing from each well of said first row of wells and third row of wells.

8. A method as recited in claim 1 in which said injected water displaces said reservoir brine.

9. A method for producing geothermal energy from a subterranean brine reservoir comprising the steps of:
    injecting water into said reservoir and into contact with said reservoir brine, the uppermost limit of salt content of said injected water being that at which no substantial amount of salt precipitates and drops out of water later produced from said reservoir;
    halting said injection of said water; and
    producing water from said reservoir, said reservoir heat heating said injected water in said reservoir.

10. A method as recited in claim 8 including repeating said injection-production cycle.

11. A method as recited in claim 8 in which at least two spaced apart well bores are drilled into said reservoir and including:
    conducting injection-production cycles through each of said well bores;
    halting said injection-production cycles conducted through each of said well bores;
    injecting water into one of said well bores to displace heat to at least one other of said well bores; and
    producing water from said other well bore.

12. A method for producing geothermal energy and/or minerals from subterranean brine reservoirs comprising the steps of:
    injecting water through a well bore into said reservoir and into contact with said reservoir brine;
    halting said injection of said water; and
    producing water from said reservoir;
    said injected water ranging in salinity from zero to a selected amount such that when said water is produced from said reservoir through said well bore substantially no precipitation of salts occurs in said well bore.

* * * * *